(12) United States Patent
Turcotte (10) Patent No.: US 12,404,803 B2
(45) Date of Patent: Sep. 2, 2025

(54) HYBRID GAS TURBINE ENGINE

(71) Applicant: PRATT & WHITNEY CANADA CORP., Longueuil (CA)

(72) Inventor: Hervé Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 181 days.

(21) Appl. No.: 16/901,383

(22) Filed: Jun. 15, 2020

(65) Prior Publication Data
US 2021/0388732 A1  Dec. 16, 2021

(51) Int. Cl.
| | |
|---|---|
| F01D 15/10 | (2006.01) |
| B64D 27/33 | (2024.01) |
| B64D 31/18 | (2024.01) |
| B64D 35/022 | (2025.01) |
| F01D 15/12 | (2006.01) |
| F02C 3/073 | (2006.01) |
| F02C 3/14 | (2006.01) |
| F02C 6/20 | (2006.01) |

(Continued)

(52) U.S. Cl.
CPC .............. *F02C 3/145* (2013.01); *B64D 27/33* (2024.01); *B64D 31/18* (2024.01); *B64D 35/022* (2024.01); *F01D 15/10* (2013.01); *F01D 15/12* (2013.01); *F02C 3/073* (2013.01); *F02C 6/206* (2013.01); *F02C 7/32* (2013.01); *F02C 7/36* (2013.01)

(58) Field of Classification Search
CPC .......... F01D 15/10; F01D 15/12; F02C 3/073; F02C 3/145; F02C 6/206; F02C 7/32; F02C 7/36; F05D 2220/324; F05D 2260/4031; F16H 57/038; F16H 2057/02034; B64D 27/33; B64D 31/18; B64D 35/022
See application file for complete search history.

(56) References Cited

U.S. PATENT DOCUMENTS

| | | |
|---|---|---|
| 7,514,810 B2 | 4/2009 | Kern et al. |
| 7,841,163 B2 | 11/2010 | Welch et al. |
| 8,314,505 B2 | 11/2012 | McLoughlin et al. |

(Continued)

FOREIGN PATENT DOCUMENTS

| | | |
|---|---|---|
| EP | 3361073 A1 | 8/2018 |

OTHER PUBLICATIONS

European Search Report issue in counterpart EP application No. 21179644.6 on Nov. 11, 2021.

*Primary Examiner* — Devon C Kramer
*Assistant Examiner* — Henry Ng
(74) *Attorney, Agent, or Firm* — NORTON ROSE FULBRIGHT CANADA LLP (57) ABSTRACT

A hybrid multi-spool gas turbine engine, has: a LP spool and a HP spool rotatable about a central axis, the LP spool having an LP compressor and an LP turbine engaged to the LP compressor via an LP shaft, the LP shaft engaged to a rotatable load at a first end thereof, the HP spool having an HP turbine and an HP compressor engaged to the HP turbine via a HP shaft; an accessory gearbox (AGB) engaged to both of the LP shaft and the HP shaft and located proximate a second end thereof, the AGB having at least one accessory output drivingly engageable to at least one accessory and at least one input; and at least one electric motor drivingly engaged to the at least one input of the AGB, the at least one electric motor drivingly engaged to the rotatable load via the AGB and the LP shaft.

7 Claims, 4 Drawing Sheets

(51) Int. Cl.
  *F02C 7/32*  (2006.01)
  *F02C 7/36*  (2006.01)

(56) References Cited

U.S. PATENT DOCUMENTS

| | | | |
|---|---|---|---|
| 10,208,675 B2* | 2/2019 | Mackin | B64D 27/24 |
| 10,408,133 B2 | 9/2019 | Wintgens et al. | |
| 10,533,459 B1* | 1/2020 | Knecht | F02C 7/36 |
| 11,092,220 B1* | 8/2021 | Mancini | B60K 17/08 |
| 2008/0072568 A1* | 3/2008 | Moniz | F02C 7/32 |
| | | | 60/226.1 |
| 2009/0007569 A1* | 1/2009 | Lemmers, Jr. | F02C 7/36 |
| | | | 60/39.163 |
| 2016/0097328 A1* | 4/2016 | Wintgens | F02C 7/32 |
| | | | 415/123 |
| 2017/0320584 A1 | 11/2017 | Menheere | |
| 2018/0003109 A1 | 1/2018 | Ents et al. | |
| 2018/0223740 A1* | 8/2018 | Forest | F02C 7/268 |
| 2018/0283274 A1* | 10/2018 | Jackowski | F02C 7/36 |
| 2018/0347471 A1* | 12/2018 | Wotzak | F02C 7/32 |
| 2019/0323426 A1* | 10/2019 | Mackin | F02C 3/04 |
| 2019/0368370 A1 | 12/2019 | Chandler | |
| 2019/0376405 A1* | 12/2019 | Lavoie | F02N 11/04 |
| 2020/0248632 A1* | 8/2020 | Leque | F02C 7/275 |
| 2020/0354068 A1* | 11/2020 | Razak | F16H 1/28 |
| 2020/0400078 A1* | 12/2020 | Hanrahan | F02C 7/36 |
| 2021/0108569 A1* | 4/2021 | Devendorf | B64C 1/38 |
| 2021/0246835 A1* | 8/2021 | Garabello | F02C 7/32 |
| 2021/0341072 A1* | 11/2021 | Mudra | F16K 31/046 |

\* cited by examiner

HYBRID GAS TURBINE ENGINE

TECHNICAL FIELD

The application relates generally to gas turbine engines and, more particularly, to a hybrid gas turbine engine.

BACKGROUND OF THE ART

Hybrid electric aircraft propulsion systems combine combustion and electric propulsion technologies. In an electric propulsion system, electrical energy is converted to rotational energy by an electric motor to drive a rotor, such as a prolusion fan or a propeller. There are environmental and cost benefits to having at least a portion of the power for an aircraft propulsion system to come from electric motors. Therefore, there is a need for improvement to existing architectures.

SUMMARY

In one aspect, there is provided a hybrid multi-spool gas turbine engine, comprising: a low-pressure (LP) spool and a high-pressure (HP) spool rotatable independently of one another about a central axis, the LP spool having an LP compressor and an LP turbine drivingly engaged to the LP compressor via an LP shaft, the LP shaft drivingly engaged to a rotatable load at a first end thereof, the HP spool having an HP turbine and an HP compressor drivingly engaged to the HP turbine via a HP shaft; an accessory gearbox (AGB) drivingly engaged to both of the LP shaft and the HP shaft and located proximate a second end thereof, the AGB having at least one accessory output drivingly engageable to at least one accessory and at least one input; and at least one electric motor drivingly engaged to the at least one input of the AGB, the at least one electric motor drivingly engaged to the rotatable load via the AGB and the LP shaft.

In another aspect, there is provided an hybrid multi-spool gas turbine engine, comprising: a thermal module having a low-pressure (LP) shaft drivingly engaging a LP compressor to a LP turbine and rotatable about a central axis, a high-pressure (HP) shaft drivingly engaging a HP compressor to a HP turbine and rotatable about the central axis, the LP shaft rotatable relative to the HP shaft about the central axis; an output shaft drivingly connectable to a rotatable load, the output shaft drivingly engaged to the LP shaft; an electric module having at least one electric motor and an accessory gearbox (AGB), the AGB drivingly engaged to the HP shaft and to the LP shaft, the AGB having an accessory output for driving an accessory and at least one input drivingly engaged to the at least one electric motor, the at least one electric motor drivingly engaged to the output shaft via the AGB and the LP shaft.

DESCRIPTION OF THE DRAWINGS

Reference is now made to the accompanying figures in which.

DETAILED DESCRIPTION

Figure 1A:
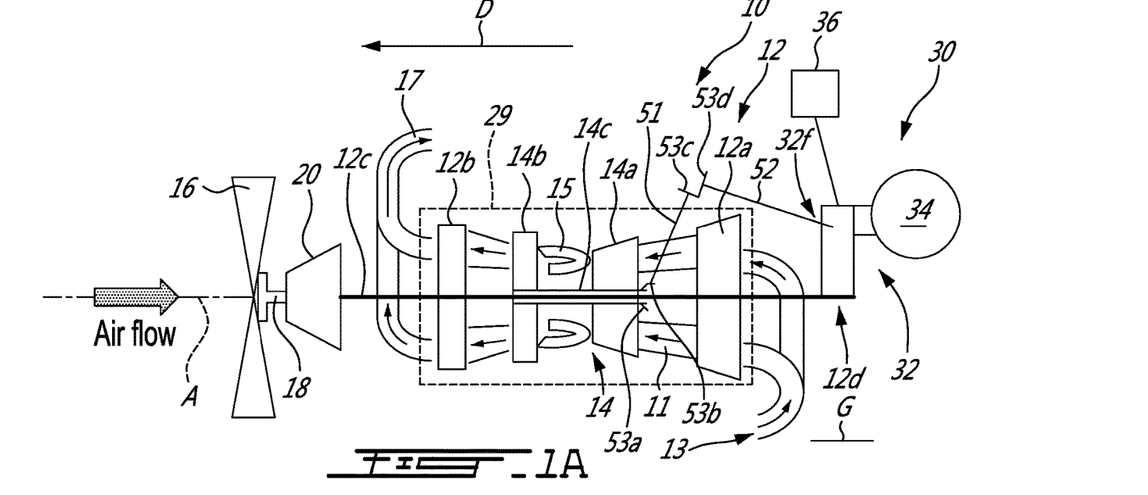
FIG. 1A is a schematic side cross sectional view of an hybrid gas turbine engine in accordance with one embodiment.

FIG. 1A illustrates a first example of an hybrid arrangement 10 of a type preferably provided for use in subsonic flight, and generally comprising an engine core, also referred to as thermal module 29, having a turbomachinery with multiple spools which perform compression to pressurize atmospheric air received through an air inlet 13, and which extract energy from combustion gases before they exit the engine via an exhaust outlet 17. The engine core further comprises a core gaspath 11 to direct gases from the air inlet 13 to the exhaust outlet 17, as depicted by the flow arrows in FIG. 1. In the depicted embodiment, the core gaspath 11 is annular and is concentric relative to the engine central axis A.

The term "spool" is herein intended to broadly refer to drivingly connected turbine and compressor rotors and is, thus, not limited to a compressor and turbine assembly on a single shaft. It also includes a rotary assembly with multiple shafts geared together.

In the embodiment shown in FIG. 1A, the engine core includes a low pressure (LP) spool 12 and a high pressure (HP) spool 14. The LP spool 12 generally comprises an LP compressor 12a for pressurizing air received from the air inlet 13 and an LP turbine 12b for extracting energy from combustion gases discharged from a combustor 15 in which compressed air is mixed with fuel and ignited for generating an annular stream of hot combustion gases. The LP turbine 12b is herein connected mechanically to the LP compressor 12a via a LP shaft 12c. Flow communication between the two LP compressor 12a and the low pressure turbine 12b is through the high pressure spool 14 and the combustor 15 via the core gaspath 11. According to one aspect of the embodiment shown in FIG. 1, the LP compressor 12a and the LP turbine 12b are coaxially mounted for rotation about a common axis, which may correspond to the engine central axis A.

The gas turbine engine 10 is a reverse-flow engine in that the air flows within the core gaspath 11 in the same direction as a direction of travel D of the hybrid engine 10. This differs than a straight-flow engine in which the air flows in a core gaspath in an opposite direction than that of travel. It will be appreciated that the present disclosure may be applied alternatively to a straight-flow engine.

The HP spool 14 generally comprises an HP compressor 14a connected in flow communication with the LP compressor 12a for receiving pressurized air therefrom via the core gaspath 11. The HP spool 14 further comprises an HP turbine 14b, which is located downstream of the combustor 15. The HP turbine 14b is drivingly connected to the HP compressor 14a via an HP shaft 14c. In the illustrated embodiment, the LP compressor 12a, the LP turbine 12b, the HP turbine 14b and the HP compressor 14a are all mounted for rotation about the engine central axis A.

The LP turbine 12b is also known as the power turbine. The LP turbine 12b may drive two or more rotatable loads. According to the illustrated embodiment, the first load is a propeller 16, which provides thrust for flight and taxiing in aircraft applications. However, it is understood that the first load could be any suitable component, or any combination of suitable components, that is capable of receiving a rotational drive from the LP turbine 12b. For instance, in an alternate embodiment where the engine 10 is a turboshaft instead of a turboprop as depicted in FIG. 1, the first load could include helicopter main rotor(s) and/or tail rotor(s), pump(s), generator(s), gas compressor(s), marine propeller(s), etc.

In the embodiment shown in FIG. 1A, the first load (i.e. the propeller 16) is drivingly coupled to an output shaft 18 extending axially from an output end of a reduction gearbox (RGB) 20. The input end of the RGB 20 is mechanically coupled to the LP turbine shaft 12c drivingly connected to the LP turbine 12b. As shown in FIG. 1A, the LP turbine shaft 12c and the output shaft 18 are coaxial to the engine central axis 11. The RGB 20 processes and outputs the rotational drive transferred thereto from the LP turbine 12b via the LP turbine shaft 12c through known gear reduction techniques. The RGB 20 allows for the propeller 16 to be driven at a rotational speed, which is different from the rotational speed of the LP turbine 12b, which may thereby provide for better efficiency.

Referring to FIGS. 1A to 10, the hybrid engine 10 includes the thermal module 29 and an electric module also referred to as an electrical drive system 30, which is drivingly engaged to the LP shaft 12c such that power extracted from the combustion gases by the LP turbine 12b and electrical power are compounded to drive the rotatable load (e.g., propeller 16). In the embodiment shown, the electrical drive system 30 includes a gearbox 32 and one or more electric motor 34 in driving engagement with the gearbox 32. The gearbox 32 is an accessory gear box AGB and is drivingly engaged to one or more accessories 36, either directly or via a toward shaft. These accessories 36 may be, for instance, fuel pump(s), hydraulic pump(s), starter/generator, generator(s), and so on. The electric motor(s) 34 is/are coupled to the output shaft 18 via the LP shaft 12c, the AGB 32, and the RBG 20. It will be appreciated that although the engine 10 is depicted as a turboprop engine, the present disclosure also applies to a turboshaft engine. The electric motor(s) may also be used as a generator.

The AGB 32 has a power-turbine-driven gear train and may have a gas-generator-driven gear train. An example of such an AGB is described in U.S. Pat. No. 10,465,611 and in U.S. patent application Ser. No. 15/351,803, the entire contents of which are incorporated herein by reference.

The gearbox 32 has at least one input 32a each drivingly engaged to a respective one of the at least one electric motor 34 and an output 32b drivingly engage to the LP shaft 12c. In the embodiment shown, the gearbox 32 is located proximate a rear end of the hybrid engine 10 relative to a direction of travel D of the hybrid engine 10. In other words, the output 32b of the gearbox 32 is drivingly engaged to a rear end 12d of the LP shaft 12c. In the embodiment shown, the gearbox 32 is located rearward of the air inlet 13 of the hybrid engine 10. In the present embodiment, the output shaft 18 and the electric module 30 are disposed on opposite sides of the thermal module 29. Stated differently, the LP turbine 12b is located between the propeller 16 and the HP turbine 14b. The air inlet 13 of the LP compressor 12a is located between the AGB 32 and the LP compressor 12a. It will be appreciated that the disclosed engine may be used in as a pusher-type turboprop. In such a case, the AGB 32 would be located at the front of the engine relative to the direction of travel.

In the embodiment shown, the gearbox 32 has an input 32f drivingly engaged to the HP shaft 14c. As shown in FIG. 1A, the gearbox 32 is drivingly engaged to the HP shaft 14c. To get around the LP compressor 12a, which is physically disposed between the HP compressor 14a and the AGB 32, an HP offset drive may be used. The HP offset drive may include a tower shaft 51 that is mechanically coupled to a rear end of the HP shaft 14c and driven thereby. The tower shaft 51 extends from the HP spool 14 in a direction away from the engine axis A for connection with an accessory gear box drive shaft 52 mechanically coupled to the tower shaft 51 and to the AGB 32. As can be appreciated from FIG. 1A, the AGB drive shaft 52 has a main axial component parallel to the engine axis A to bridging the tower shaft to the AGB 32. A first bevel gear 53a is secured to the rear end of the HP shaft 14c for integral rotation therewith about the central axis A and is meshed with a second bevel gear 53b that is secured to the tower shaft 51 at an end thereof. The tower shaft 51 is secured to a third bevel gear 53 at the opposite end of the tower shaft 51. The third bevel gear 53c is meshed with a fourth bevel gear 53b that is secured to the AGB drive shaft 52 for integral rotation therewith. Rotation of the HP shaft 14c is transmitted to the input 32f of the AGB 32 via the bevel gears 53a, 53b, 53c, 53d and the toward and AGB drive train shafts 51, 52. In a particular embodiment, the AGB 32 is connected only to the LP shaft 12c and disconnected from the HP shaft 14c. In such a case, another AGB is used and connected to the HP shaft to drive a fuel control unit and a starter.

The AGB 32 may define two independent gear paths; a first gear path drivingly engaging the HP shaft 14c to one or more accessories and a second gear path drivingly engaging the LP shaft 12c to one or more other accessories. The one or more electric motors 34 are independent from the HP shaft 14c.

In use, the propeller 16 rotates about the central axis A and generates a gyroscopic moment, that is, a moment about the central axis A. In climb, descent, turning maneuvers, and/or because of local fluctuations in the speed, density, and/or direction of the air, the propeller 16 may generate a moment about an axis normal to the central axis A. Such a moment is referred to as a 1P moment. The 1P moment is caused by having one of blades of the propeller 16 generating more thrust than at least another blade, for instance, a diametrically opposed one of the blades. This difference in the thrusts may be caused, for instance, when an aircraft equipped with the hybrid engine 10 is climbing, which results in a bottom one of the blades defining an angle of attack with an incoming air flow greater than that between a top one of the blades and the incoming air flow. The 1P moment is therefore created by having the bottom one of the blades generating more thrust than the bottom one of the blades.

Locating the gearbox 32 rearward of the hybrid engine 10, that is by locating the propeller 16 and the gearbox 32 at respective opposite ends of the LP shaft 12c, the gearbox 32 may become protected or shielded from the loads imparted on the LP shaft 12c by the 1P moment. In a particular embodiment, having the gearbox 32 located at an opposite end of the LP shaft 12c away from the propeller 16 allows to size and dimension the gearbox 32 and its internal components to be lighter compared to a configuration in which the gearbox 32, and the at least one electric motor 34, are located between the RGB 20 and thermal module 29 of the hybrid engine 10. In other words, locating the electrical drive system 30 between the propeller 16 and the LP turbine 12b requires the gearbox 32 to be sized and dimensioned to be able to withstands the load imparted thereto by the propeller 16. Weight savings may therefore be achieved by distancing the electrical drive system 30 from the propeller 16. Moreover, locating the AGB 32 rearward of the engine 10 allows to keep a length of the engine 10 along the central axis A as short as possible. If the AGB 32 were located between the propeller 16 and the thermal module 29, the propeller 16 may have to be moved axially forward thereby increasing the length of the engine 10, which may impact engine performance.

Figure 1B:
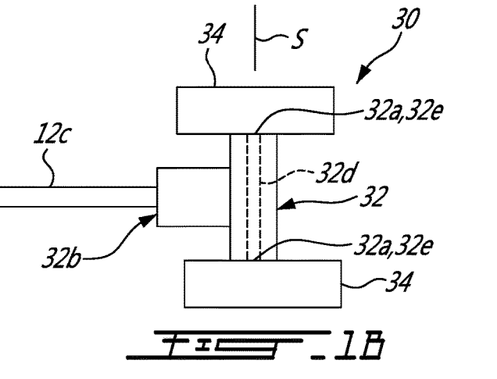
FIG. 1B is a schematic top view of a portion of the hybrid gas turbine engine of FIG. 1A.
Figure 1C:
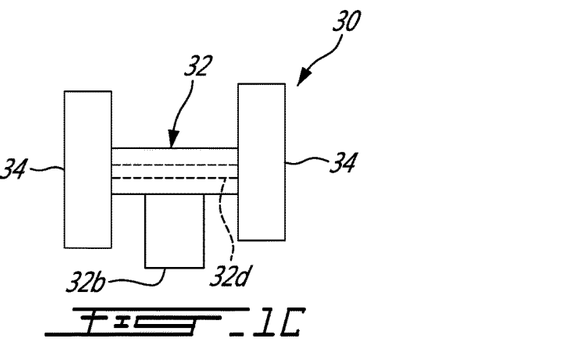
FIG. 1C is a schematic rear view of a portion the hybrid gas turbine engine of FIG. 1A.

Still referring to FIGS. 1A-1C, in the embodiment shown, the electrical drive system 30 includes two electric motors 34 each drivingly engaged to a respective one of two inputs 32a of the gearbox 32. Herein, the two inputs 32 are defined by opposite ends 32e of a single shaft 32d. The single shaft 32d extends along a shaft axis S. The shaft axis S extends in a direction being transverse to the central axis A of the engine 10. The shaft axis S is radially offset from the central axis A of the engine 10. In the embodiment shown, the shaft 32 is located above the LP shaft 12c relative to a ground G. The shaft axis S is herein perpendicular to the central axis A of the engine 10. In a particular embodiment, disposing the shaft axis S, and rotational axes of the two electric motors 34, perpendicular to the central axis A of the engine 10 allows to reduce a total length of the engine 10; the length being taken along the central axis A. It will be appreciated that more than one motor may be in driving engagement with each of the opposite ends 32e of the single shaft 32d. In other words, two or more motors 34 may be engaged to a first one of the ends 32e of the shaft 32d and two or more motors 34 may be engaged to the second one of the ends 32e of the shaft 32d, for a total of four or more motors.

Figure 1D:
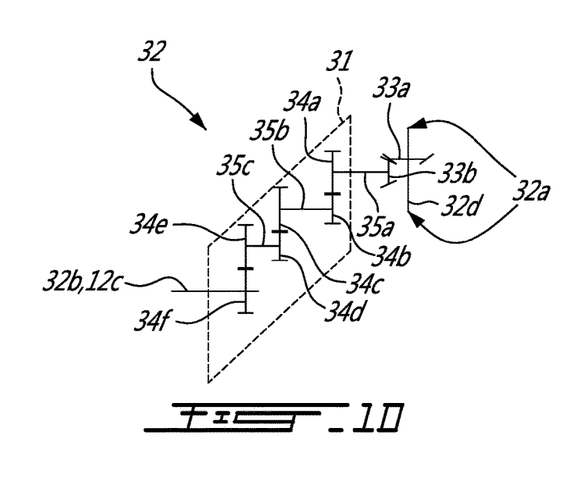
FIG. 1D is a schematic side view of a gear arrangement of an accessory gearbox (AGB) of the hybrid gas turbine engine of FIG. 1A.
Figure 1E:
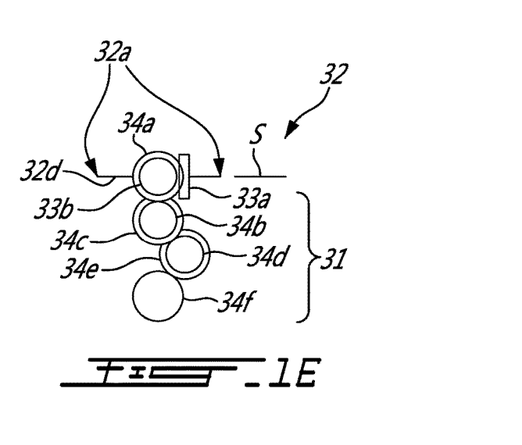
FIG. 1E is a schematic rear view of the gear arrangement of FIG. 1D.

Referring to FIGS. 1D-1E, since the LP shaft 12c rotates at a different rotational speed than that of the electric motors 34, the gearbox 32 is used to create a rotational speed ratio between the input 32a and the output 32b to match the rotational speeds. In the embodiment shown, the single shaft 32d of the gearbox 32 is secured to a first bevel gear 33a for integral rotation therewith. Herein, "integral rotation" implies that two elements rotate as if they were monolithic with one another. The first bevel gear 33a is meshed with a second bevel gear 33b. In the embodiment shown, an axis of rotation of the second bevel gear 33b is perpendicular to the shaft axis S.

The gearbox 32 includes a gear assembly 31, which includes a plurality of gears meshed with one another and being sized to impart a speed ratio. In the embodiment shown, the gear assembly 31 includes six spur gears meshed in pairs; a driving one of at least one of the pairs has a diameter greater than a driven one of the at least one of the pairs to increase a rotational speed. It will be appreciated that the arrangement of the gears of the gearbox 32 (e.g., diameters, numbers of pairs, etc) is exemplary and any suitable gear arrangement able to achieve the required speed ratio is contemplated without departing from the scope of the present disclosure.

In the embodiment shown, the gear assembly 31 includes a first spur gear 34a drivingly engaged to the second bevel bear 33b via a first shaft 35a. The first spur gear 34a is meshed with a second spur gear 34b, which is drivingly engaged to a third spur gear 34c via a second shaft 35b. The third spur gear 34c is meshed with a fourth spur gear 34d, which is drivingly engaged to a fifth spur gear 34e via a third shaft 35c. The fifth spur gear 34e is meshed with a sixth spur gear 34f, which defines the output 32b of the AGB 32 and which is drivingly engaged to the LP shaft 12c.

As shown in FIG. 1D, a first speed increase ratio is generated by having a diameter of the first bevel gear 33a greater than that of the second bevel gear 33b. A second speed increase ratio is generated by having a diameter of the first spur gear 34a greater than that of the second spur gear 34b. A third speed increase ratio is generated by having a diameter of the third spur gear 34c greater than that of the fourth spur gear 34d. And, a speed ratio of one is achieved by having a diameter of the fifth spur gear 34e corresponding to that of the sixth spur gear 34f. It will be appreciated that a diameter of the sixth spur gear 34f may be smaller than that of the fifth spur gear 34e to generate a speed increase ratio. The diameter of the sixth spur gear 34f may be equal to that of the fourth spur gear 34d.

In the embodiment shown, the first shaft 35a that connects the second bevel gear 33b to the first spur gear 34a is vertically aligned with and parallel to the LP shaft 12c. The first shaft 35a is parallel to the LP shaft 12c. In the present case, each of the three pairs of spur gears 34a-34b, 34c-34d, and 34e-34f are axially offset from one another relative to the central axis A and spaced apart by the first, second, and third shafts 35a, 35b, 35c. Each of the first, second, and third shafts 35a, 35b, 35c are parallel to, and radially offset from, the central axis A about which the LP shaft 12c rotates.

Referring now to FIGS. 2A to 2E, a hybrid gas turbine engine in accordance with another embodiment is shown generally at 110. For the sake of conciseness, only elements that differ from the engine 10 described above with reference to FIGS. 1A to 1E are described below.

The engine 110 has an electrical drive system 130 that includes two electric motors 34 and a gear box 132. The two electric motors 34 are drivingly engaged to two shafts 132d1, 132d2, which are rotatable about shaft axes S1, S2. The two shaft axes 51, S2 are parallel to one another and both radially offset from one another and radially offset from the central axis A of the engine 110. The central axis A is herein equidistantly spaced apart from both of the two shaft axes 51, S2.

In the embodiment shown, the gearbox 132 defines two gear paths P1, P2 engaged to one another. Each of the two electric motors 34 is drivingly engaged to the LP shaft 12*c* via a respective one of the two gear paths P1, P2. In the embodiment shown, the gearbox 132 includes the gear assembly 31 described herein above with reference to FIGS. 1D-1E. In the present embodiment, the gear assembly 31 combines the rotational inputs of both of the two electric motors 34 into a single rotational output to be supplied to the LP shaft 12*c*. In other words, the two gear paths P1, P2 converges into a single gear path into the gear assembly 31.

Figure 2A:
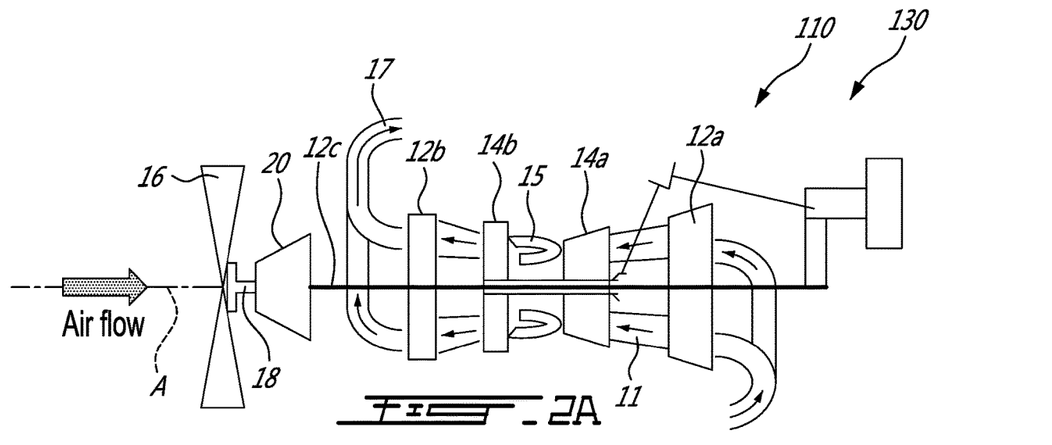
FIG. 2A is a schematic side cross sectional view of an hybrid gas turbine engine in accordance with one embodiment.
Figure 2B:
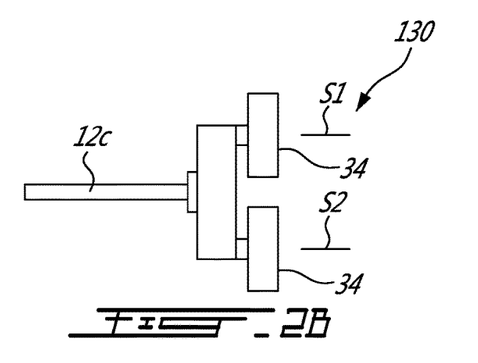
FIG. 2B is a schematic top view of a portion of the hybrid gas turbine engine of FIG. 2A.
Figure 2C:
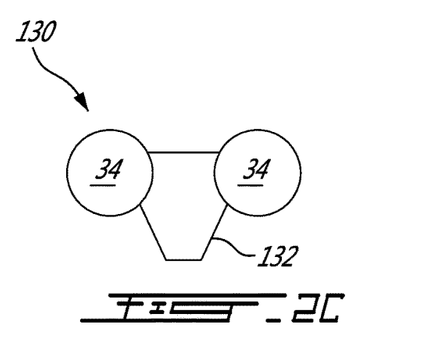
FIG. 2C is a schematic rear view of a portion the hybrid gas turbine engine of FIG. 2A.
Figure 2D:
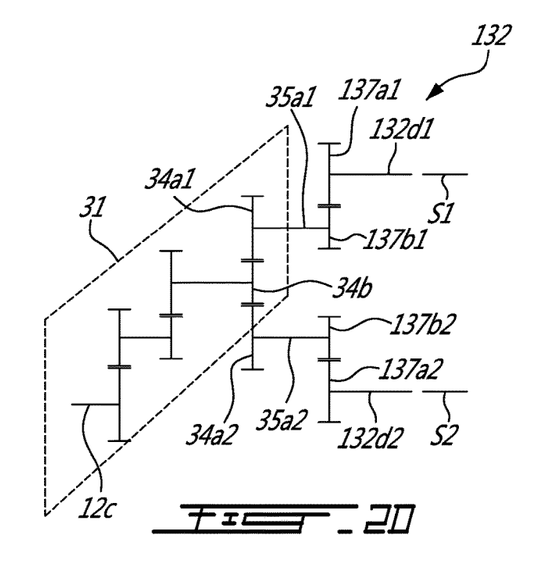
FIG. 2D is a schematic side view of a gear arrangement of an accessory gearbox (AGB) of the hybrid gas turbine engine of FIG. 2A.
Figure 2E:
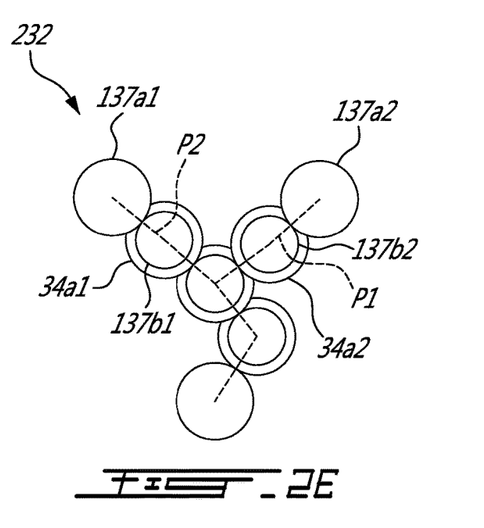
FIG. 2E is a schematic rear view of the gear arrangement of FIG. 2D.
Figure 3A:
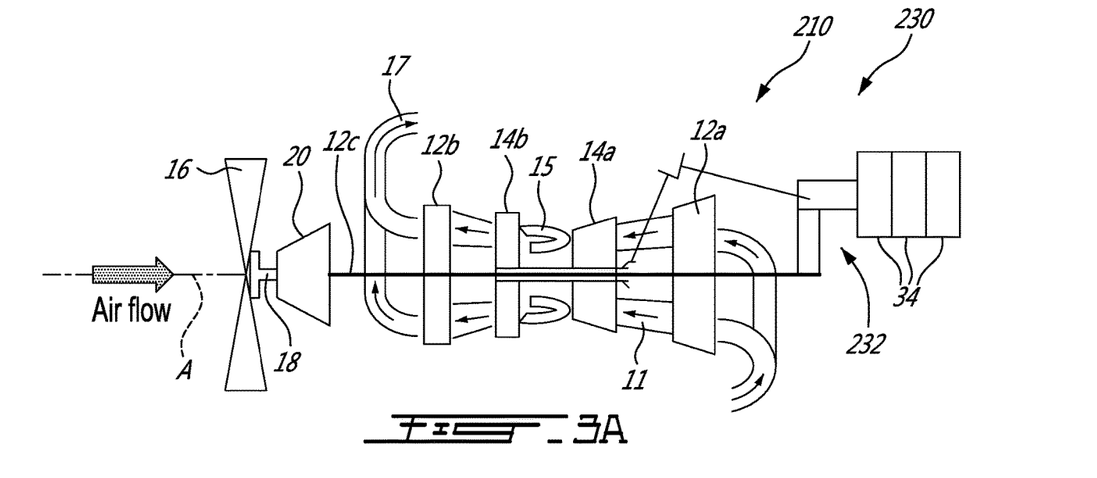
FIG. 3A is a schematic side cross sectional view of an hybrid gas turbine engine in accordance with one embodiment.
Figure 3B:
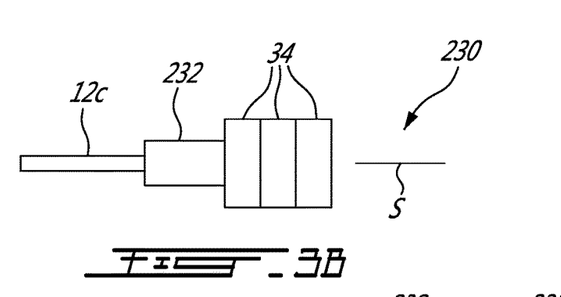
FIG. 3B is a schematic top view of a portion of the hybrid gas turbine engine of FIG. 3A.
Figure 3C:
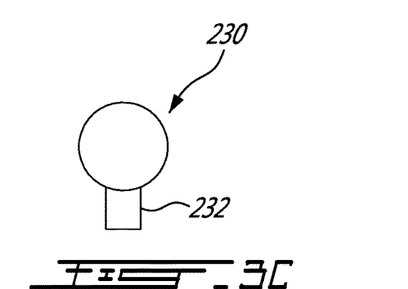
FIG. 3C is a schematic rear view of a portion the hybrid gas turbine engine of FIG. 3A.
Figure 3D:
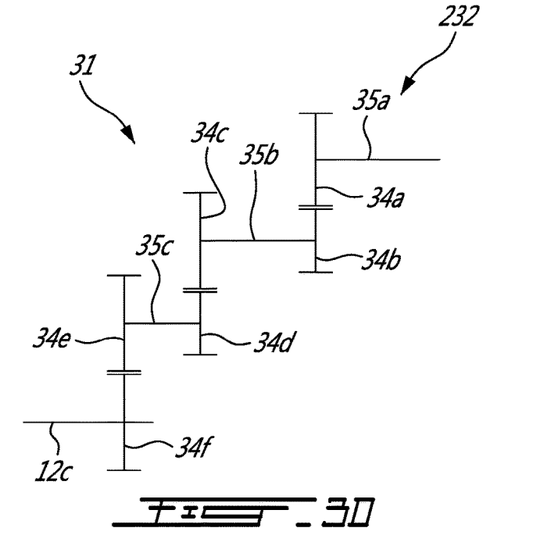
FIG. 3D is a schematic side view of a gear arrangement of an accessory gearbox (AGB) of the hybrid gas turbine engine of FIG. 3A.
Figure 3E:
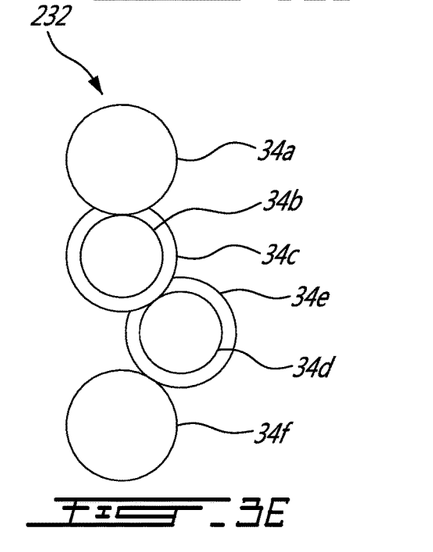
FIG. 3E is a schematic rear view of the gear arrangement of FIG. 3D.
Figure 4A:
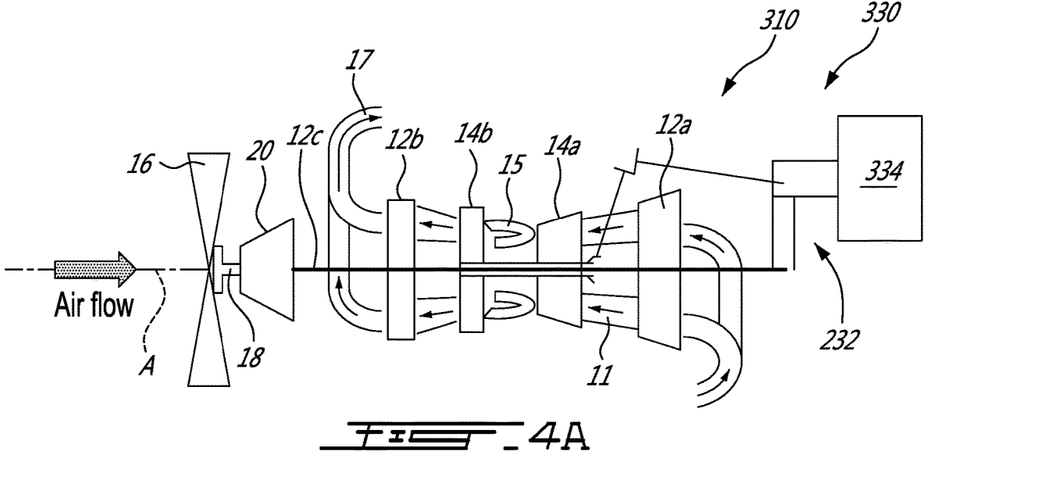
FIG. 4A is a schematic side cross sectional view of an hybrid gas turbine engine in accordance with one embodiment.
Figure 4B:
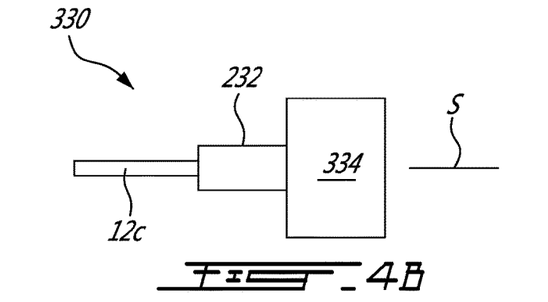
FIG. 4B is a schematic top view of a portion of the hybrid gas turbine engine of FIG. 4A.
Figure 4C:
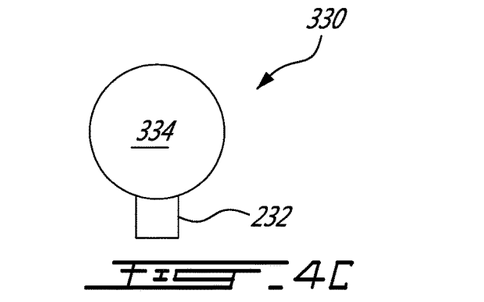
FIG. 4C is a schematic rear view of a portion the hybrid gas turbine engine of FIG. 4A.
Figure 4D:
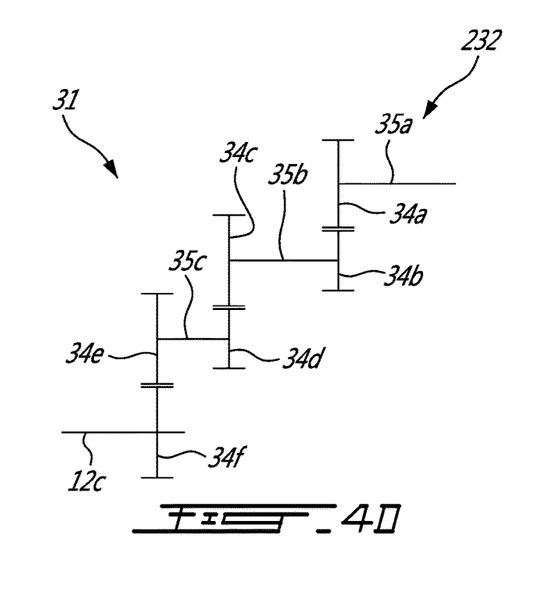
FIG. 4D is a schematic side view of a gear arrangement of an accessory gearbox (AGB) of the hybrid gas turbine engine of FIG. 4A.
Figure 4E:
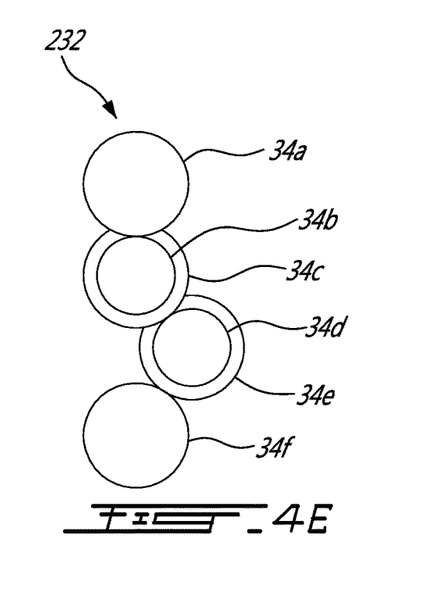
FIG. 4E is a schematic rear view of the gear arrangement of FIG. 4D.

In the embodiment shown, each of the two shafts 132*d*1, 132*d*2 is secured to a respective one of two first spur gears 137*a*1, 137*a*2 for integral rotation therewith. Each of the two first spur gears 137*a*1, 137*a*2 is meshed with a respective one of two second spur gears 137*b*1, 137*b*2 having a diameter less than that of the two first spur gears 137*a*1, 137*a*2 to generate a speed ratio. Each of the two second spur gears 137*b*1, 137*b*2 is rotating integrally with a respective one of two first shafts 35*a*1, 35*a*2. The two first shafts 35*a*1, 35*a*2 are drivingly engaged to two first spur gears 34*a*1, 34*a*2 of the gear assembly 31. Hence, in the embodiment shown, two gears, that are the two first spur gears 34*a*1, 34*a*2 of the gear assembly 31, are meshed with the second spur gear 34*b* of the gear assembly 31. Rotation directions of the two electric motors 34 are adjusted consequently.

It will be appreciated that more than one motor may be in driving engagement with each of the two shafts 132*d*1, 132*d*2. In other words, two or more motors 34 may be engaged to a first one 132*d*1 of the two shafts 132*d*1, 132*d*2 and two or more motors 34 may be engaged to the second one 132*d*2 of the two shafts 132*d*1, 132*d*2 for a total of four or more motors.

Referring now to FIGS. 3A to 3E, a hybrid gas turbine engine in accordance with another embodiment is shown generally at 210. For the sake of conciseness, only elements that differ from the engine 10 described above with reference to FIGS. 1A to 1E are described below.

In the embodiment shown, the electrical drive system 230 includes three electric motors 34 disposed serially one behind the other along an axis S, which is radially offset from, and parallel to, the central axis A of the engine 210. In the embodiment shown, the three electric motors 34 are drivingly engaged on the first shaft 35*a* of the gear assembly 31 of the gearbox 232; the gear assembly 31 being described herein above with reference to FIGS. 1D-1E.

Referring now to FIGS. 4A to 4E, a hybrid gas turbine engine in accordance with another embodiment is shown generally at 310. For the sake of conciseness, only elements that differ from the engine 10 described above with reference to FIGS. 3A to 3E are described below.

In the embodiment shown, the electrical drive system 330 includes a single electric motor 334 defining a motor axis S being radially offset from, and parallel to, the central axis A. In the embodiment shown, the electric motor 334 is drivingly engaged to the first shaft 35*a* of the gear assembly 31, which is described herein above with reference to FIGS. 1D-1E. In the present case, a power of the single electric motor 334 is greater than any of the electric motors 34 of the electrical drive system 230 of FIGS. 3A-3E.

The above described hybrid engines 10, 110, 210, 310 allows for electric motor(s) 34, 334 to send power to the output shaft 18 via the LP shaft 12*c* and the AGB 32, 132, 232. This may further allow to limit movement of the propeller 16 forward to place the electrical drive system between the propeller 16 and the thermal module 29, this may keep the engine length as short as possible, which may offer aerodynamic advantages; allows usage of several electric motors, which may provide redundancy and power output flexibility; keeping the electric motors 34, 334 out of the load path of the 1P moment (for turboprop application); may not require any special mounting frame to install the electric motors 34, 334; and the tandem mounting approach of FIGS. 1A-1E may allow to obtain a lighter engine with a more compact installation.

Embodiments disclosed herein include:

A. A hybrid multi-spool gas turbine engine, comprising: a low-pressure (LP) spool and a high-pressure (HP) spool rotatable independently of one another about a central axis, the LP spool having an LP compressor and an LP turbine drivingly engaged to the LP compressor via an LP shaft, the LP shaft drivingly engaged to a rotatable load at a first end thereof, the HP spool having an HP turbine and an HP compressor drivingly engaged to the HP turbine via a HP shaft; an accessory gearbox (AGB) drivingly engaged to both of the LP shaft and the HP shaft and located proximate a second end thereof, the AGB having at least one accessory output drivingly engageable to at least one accessory and at least one input; and at least one electric motor drivingly engaged to the at least one input of the AGB, the at least one electric motor drivingly engaged to the rotatable load via the AGB and the LP shaft.

B. An hybrid multi-spool gas turbine engine, comprising: a thermal module having a low-pressure (LP) shaft drivingly engaging a LP compressor to a LP turbine and rotatable about a central axis, a high-pressure (HP) shaft drivingly engaging a HP compressor to a HP turbine and rotatable about the central axis, the LP shaft rotatable relative to the HP shaft about the central axis; an output shaft drivingly connectable to a rotatable load, the output shaft drivingly engaged to the LP shaft; an electric module having at least one electric motor and an accessory gearbox (AGB), the AGB drivingly engaged to the HP shaft and to the LP shaft, the AGB having an accessory output for driving an accessory and at least one input drivingly engaged to the at least one electric motor, the at least one electric motor drivingly engaged to the output shaft via the AGB and the LP shaft.

Embodiments A and B may include any of the following elements in any combinations:

Element 1: the LP turbine is located between the rotatable load and the HP turbine. Element 2: an air inlet of the LP compressor is located between the AGB and the LP compressor. Element 3: the at least one electric motor includes two electric motors each drivingly engaged to a respective one of two inputs of the AGB. Element 4: the AGB includes a shaft drivingly engaged to the LP shaft via gears of the AGB, opposed ends of the shaft drivingly engaged to two electric motors. Element 5: the shaft is radially offset from the central axis and extends transversally to the central axis. Element 6: the shaft is secured to a first bevel gear for integral rotation therewith, the first bevel gear meshed with a second bevel gear, the first and second bevel gears being transverse to one another. Element 7: each of the two electric motors is rotatable about a respective one of two motor axes, the two motor axes being parallel and offset from one another and radially offset from the central axis. Element 8: each of the two electric motors is drivingly engaged to a respective one of two gear paths of the AGB, the two gear paths engaged to one another and drivingly engaged to the LP shaft. Element 9: the at least one electric motor is rotatable about a motor axis, the motor axis being radially offset from and parallel to the central axis. Element 10: the at least one electric motor includes three electric motors serially disposed along the motor axis. Element 11: the two electric motors are equidistantly spaced apart from the central axis. Element 12: the output shaft and the electric module are disposed on opposite sides of the thermal module. Element 13: the at least one electric motor includes two electric motors each drivingly engaged to a respective one of two inputs of the AGB. Element 14: the AGB includes a shaft drivingly engaged to the LP shaft via gears of the AGB, the shaft having two opposed ends, each of the two electric motors drivingly engaged to a respective one of the two opposed ends of the shaft. Element 15: the shaft is radially offset from the central axis and extends transversally to the central axis. Element 16: each of the two electric motors is rotatable about a respective one of two motor axes, the two motor axes being parallel and offset from one another and radially offset from the central axis. Element 17: each of the two electric motors is drivingly engaged to a respective one of two gear paths of the AGB, the two gear paths engaged to one another and drivingly engaged to the LP shaft. Element 18: the at least one electric motor includes three electric motors serially disposed along a motor axis, the motor axis parallel to and radially offset from the central axis.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A hybrid multi-spool aircraft gas turbine engine, comprising:
    a low-pressure (LP) spool and a high-pressure (HP) spool rotatable independently of one another about a central axis, the LP spool having an LP compressor and an LP turbine drivingly engaged to the LP compressor via an LP shaft, the LP shaft drivingly engaged to a rotatable load at a first end thereof, the HP spool having an HP turbine and an HP compressor drivingly engaged to the HP turbine via a HP shaft;
    an accessory gearbox (AGB) drivingly engaged to both of the LP shaft and the HP shaft and located proximate a second end of the LP shaft, the AGB having at least one accessory output drivingly engageable to at least one accessory and two inputs, the at least one accessory including a starter/generator, the AGB including a shaft drivingly engaged to the LP shaft via gears of the AGB, the shaft being radially offset from the LP shaft relative to the central axis and extending transversally to the LP shaft; and
    at least two electric motors all distinct from the starter/generator and drivingly engaged to the two inputs of the AGB, the at least two electric motors drivingly engaged to the rotatable load via the AGB and the LP shaft, the at least two electric motors simultaneously drivingly engaged to opposed ends of the shaft, the HP shaft drivingly disengaged from the at least two electric motors,
    wherein the hybrid multi-spool gas turbine engine is operable in a configuration in which a first power generated by the at least two electric motors and a second power generated by the LP turbine are compounded to drive the rotatable load.

2. The hybrid multi-spool aircraft gas turbine engine of claim 1, wherein the LP turbine is located between the rotatable load and the HP turbine.

3. The hybrid multi-spool aircraft gas turbine engine of claim 2, wherein an air inlet of the LP compressor is located between the AGB and the LP compressor.

4. The hybrid multi-spool aircraft gas turbine engine of claim 1, comprising a tower shaft secured to a first bevel gear for integral rotation therewith, the first bevel gear meshed with a second bevel gear, the first bevel gear and the second bevel gear being transverse to one another, the HP shaft drivingly engaged to an input of the AGB via the tower shaft, the first bevel gear, and the second bevel gear.

5. The hybrid multi-spool aircraft gas turbine engine of claim 1, wherein the at least two electric motors are equidistantly spaced apart from the central axis.

6. A hybrid multi-spool aircraft gas turbine engine, comprising:
    a thermal module having a low-pressure (LP) shaft drivingly engaging a LP compressor to a LP turbine and rotatable about a central axis, a high-pressure (HP) shaft drivingly engaging a HP compressor to a HP turbine and rotatable about the central axis, the LP shaft rotatable relative to the HP shaft about the central axis;
    an output shaft drivingly connectable to a rotatable load, the output shaft drivingly engaged to the LP shaft;
    an electric module having at least two electric motors and an accessory gearbox (AGB), the AGB drivingly engaged to the HP shaft and to the LP shaft, the AGB having an accessory output for driving an accessory and at least two inputs drivingly engaged to the at least two electric motors, the accessory including a starter/generator, the AGB including a shaft drivingly engaged to the LP shaft via gears of the AGB, the shaft being radially offset from the LP shaft relative to the central axis and extending transversally to the LP shaft, the at least two electric motors all distinct from the starter/generator and drivingly engaged to the output shaft via the AGB and the LP shaft, the at least two electric motors drivingly engaged to opposed ends of the shaft, the at least two electric motors drivingly disengaged from the HP shaft,
    wherein the hybrid multi-spool gas turbine engine is operable in a configuration in which a first power generated by the at least two electric motors and a second power generated by the LP turbine are compounded to drive the rotatable load.

7. The hybrid multi-spool aircraft gas turbine engine of claim 6, wherein the output shaft and the electric module are disposed on opposite sides of the thermal module.

* * * * *